Figure 1:
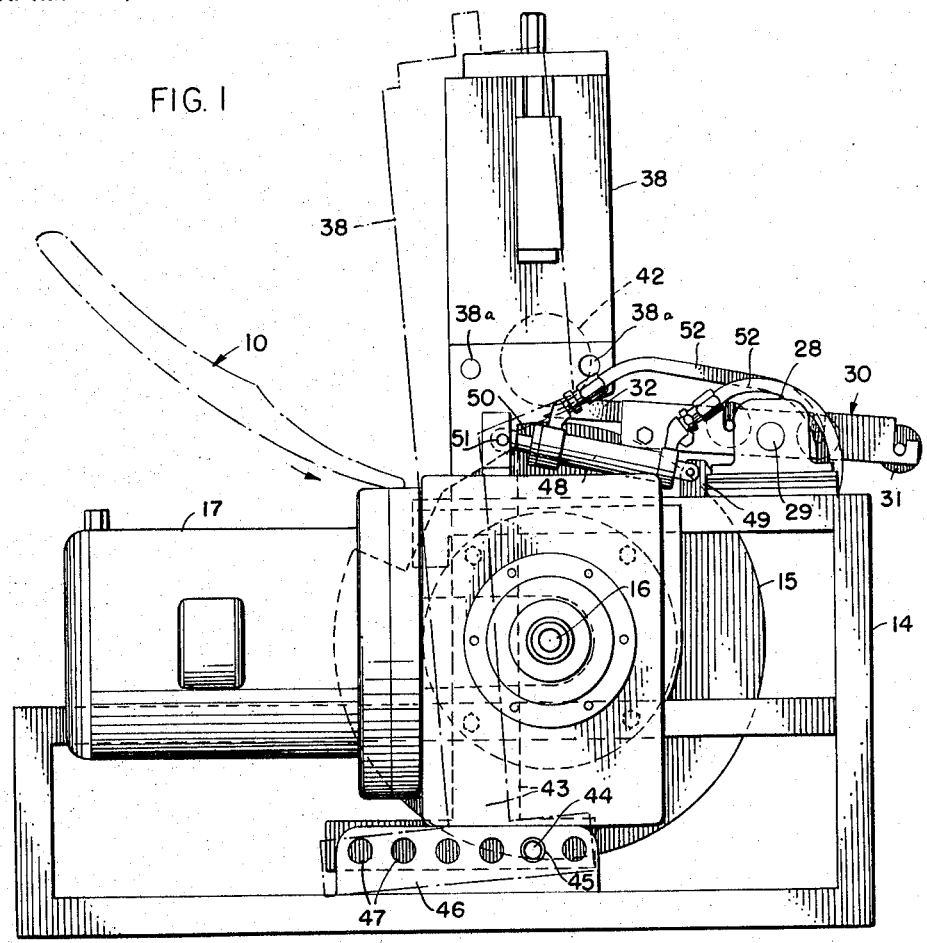

Jan. 17, 1967  D. L. RUNNELLS, JR  3,298,414

SKINNING APPARATUS

Filed March 2, 1964  3 Sheets-Sheet 1

INVENTOR:
DAVID L. RUNNELLS, JR.
BY
Carl C. Batz
ATT'Y

Jan. 17, 1967  D. L. RUNNELLS, JR  3,298,414
SKINNING APPARATUS
Filed March 2, 1964  3 Sheets-Sheet 2
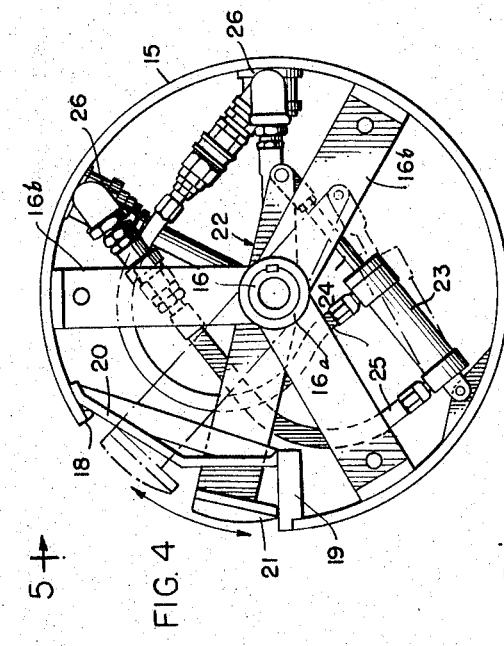
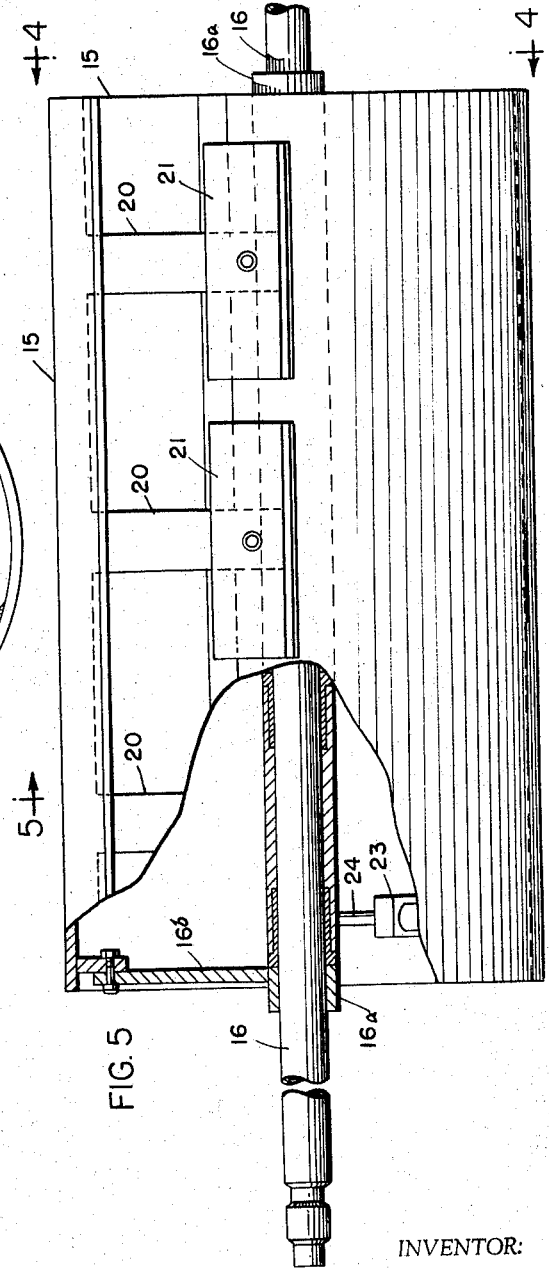
INVENTOR:
DAVID L. RUNNELLS, JR.
BY
Carl C. Batz
ATT'Y Jan. 17, 1967  D. L. RUNNELLS, JR  3,298,414
SKINNING APPARATUS
Filed March 2, 1964  3 Sheets-Sheet 3
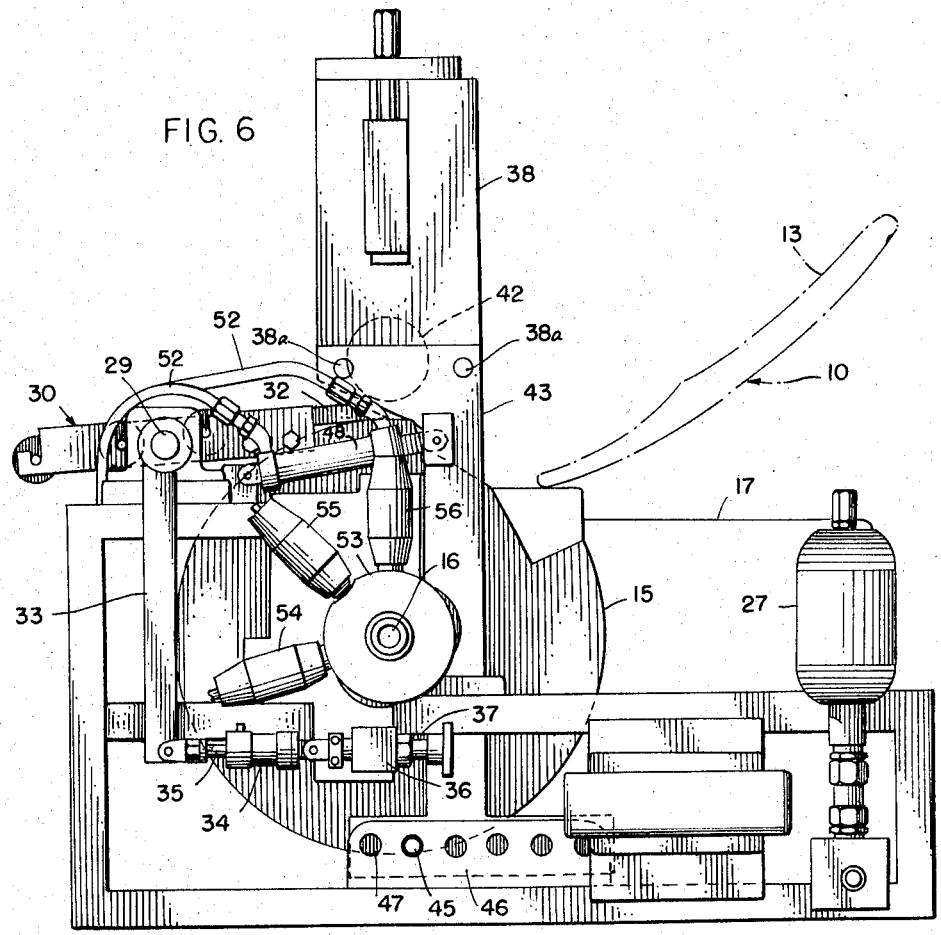
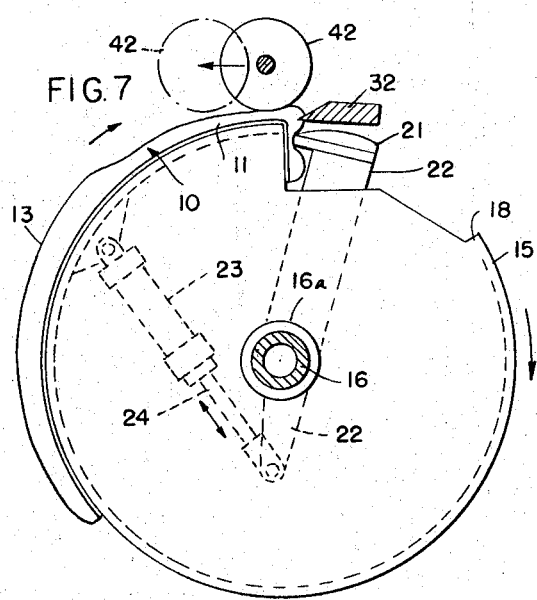
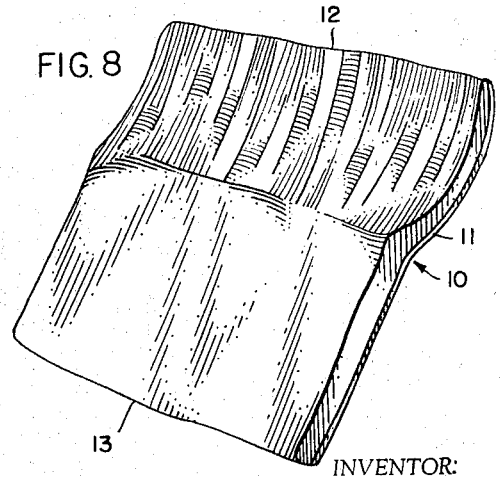
INVENTOR:
DAVID L. RUNNELLS, JR.
BY
*Carl C. Batz*
ATT'Y 3,298,414
SKINNING APPARATUS
David R. Runnells, Jr., Grand Rapids, Mich., assignor to Armour and Company, Chicago, Ill., a corporation of Delaware
Filed Mar. 2, 1964, Ser. No. 348,886
3 Claims. (Cl. 146—130)

This invention relates to skinning apparatus, and more particularly to skinning apparatus for removing the skin from the rough middle or hog side.

The rough middle or hog side from which the skin is to be removed is highly irregular in its longitudinal and transverse dimensions, and it is difficult to effectively clamp the leading edge or fat back portion for the slitting operation and to effectively remove the flesh portion, which is varying in thickness throughout, without meat losses. By way of example, the hog side may have a relatively thin fat back portion compared to the belly (bacon) portion, and if relatively even pressures are exerted upon the hog side, as in the present practice, there is a tendency for the valuable belly portion to be unduly extended, and such extended portion increases the waste when the bacon (belly portion) is later trimmed. When the belly portion is later trimmed to form the bacon slab by cutting away the boot jacket and teat portion, the belly portion which is unduly extended by reason of the pressure forms a part of the trimmed sections which are now of relatively little value as trimmings. Further, due to the fact that the leading edge (fat back portion) is of widely varying thicknesses, the gripping bar, as employed under the present practice, while tight in certain areas, is not effective as to other local areas.

Further, a problem is presented in the splitting of the hog back because of the varying thickness of the skin itself, and there has long been a need for a floating knife which will automatically follow the skin as a floating splitter, adapting itself to the thinner and thicker skin areas.

Yet a further problem is presented in the skinning of a hog back because of the areas of excess skin which cause wrinkles, and there has long been a need for an apparatus which will iron out these undulating areas in the hide.

A primary object, therefore, of the invention is to provide an apparatus for overcoming the above-described difficulties and which will effectively bring about the removal of the skin without undue elongation of the flesh portion, and particularly the belly (bacon) portion, and iron out any wrinkles in the skin. A still further object is to provide apparatus in which pressures upon the hog side will be varied during the process of splitting, while at the same time providing effective means for ejecting the skinned hog side after removal of the skin. A further object is to provide in a hog side skinning machine, power-operated means for moving a floating knife and causing the knife to traverse the skin during the splitting operation. A still further object is to provide improved clamping means enabling the fat back portion, which forms the leading edge of the hog side, to be effectively gripped and held during the skinning operation with the leading edge gripped at local spaced areas for effective holding of the leading edge in spite of its variations in thickness. Yet another object is to provide a skinning machine of novel structure in which power-operated hydraulic means are effective in an automatic skinning operation. Other specific objects and advantages will appear as the specification proceeds.

Figure 2:
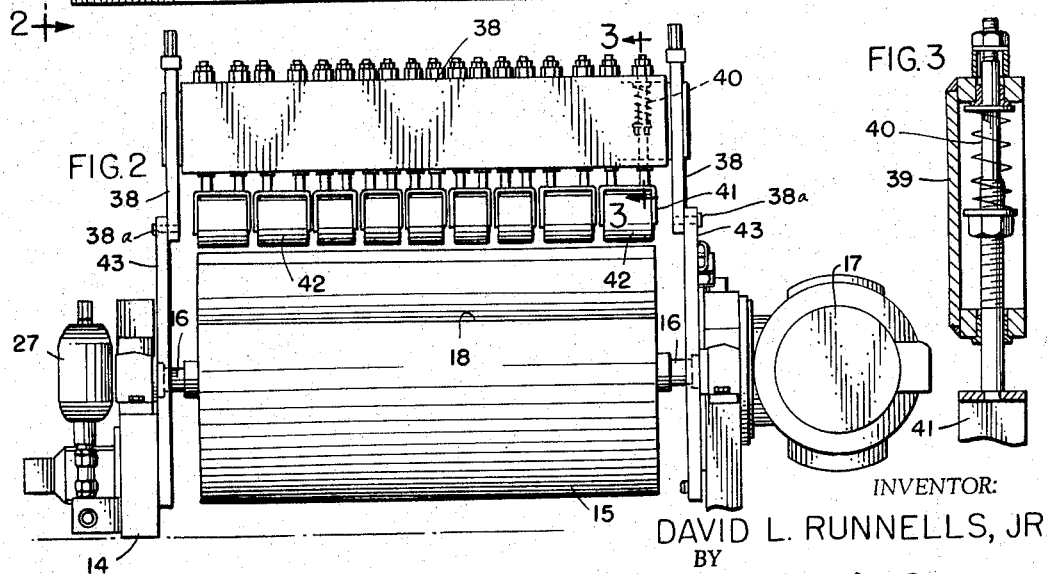
Figure 3:
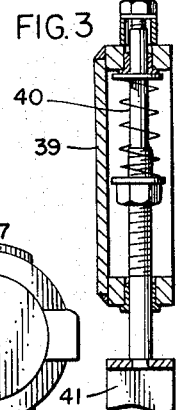

The invention is shown, in an illustrative embodiment, by the accompanying drawings, in which:

FIGURE 1 is a side view in elevation of apparatus embodying my invention;
FIG. 2, a front view on a reduced scale in elevation, the view being taken as indicated at line 2—2 of FIG. 1;
FIG. 3, a broken sectional view on an enlarged scale, the section being taken as indicated at line 3—3 of FIG. 2;
FIG. 4, a transverse view, the view being taken as indicated at line 4—4 of FIG. 5;
FIG. 5, a broken side elevational view, the view being taken as indicated at line 5—5 of FIG. 4;
FIG. 6, a side elevational view similar to FIG. 1 but showing the opposite side of the apparatus;
FIG. 7, a broken schematic view illustrating the operation of the apparatus shown in FIG. 1; and
FIG. 8, a perspective view of a rough middle or hog side which may be passed through the skinning machine for the removal of the skin.

In the illustration given in FIG. 8, a hog side 10 is shown, the skin being represented by the numeral 11. The forward edge of the hog side, indicated by the numeral 12, is called the fat back portion, and in the skinning operation it is desired to clamp this forward edge to the drum of the machine. Unfortunately, the forward edge or fat back portion 12 is highly irregular in thickness having, by way of example, one edge portion one inch in thickness, an inner portion ½ inch in thickness, another portion ¾ inch in thickness, and another edge portion 1¼ inches in thickness. Variations in thickness also extend from the leading edge 12 to the rear of the hog side 10, with the greater thickness usually in the belly portion 13 from which bacon is recovered. As above stated, if the same pressures are exerted upon the forward portion of the hog side 10 and upon the rear portion 13, it is found that the thick bacon portion 13 tends to elongate, and the elongation results in substantial losses when the portion 13 is trimmed to recover the bacon slab.

In the practice of my invention, I employ means for exerting a varying pressure upon the hog side 10 so as to maintain a relatively uniform pressure on the side to iron out the skin where excess amounts occur without elongation of the belly portion 13, while at the same time causing a floating knife to split the skin from the flesh, following the irregularities in thickness of the skin, and while also bringing about a localized gripping of the leading edge or fat back portion in spite of its irregularity in thickness.

In one embodiment of my invention, I provide a frame 14 in which is mounted a drum 15 carried by driven shaft 16, the shaft being driven through reducing gears (not shown) by motor 17. The shaft 16 may be hollow for supplying hydraulic fluid to clamping mechanism within the drum 15, as will be later described. The shaft 16 may be mounted within sleeve 16a, and the sleeve 16a may be supported by metal straps 16b, as shown best in FIG. 4, or by other suitable means.

The drum 15 is provided along one side with a cutaway or recessed portion 18, and within the recess or notch 18 is supported a clamping anvil 19, as shown best in FIG. 4. The anvil 19 is supported by brace bars 20. In order to engage local areas of the leading edge (fat back portion) of the hog side, I provide a plurality of clamps 21, as shown best in FIGS. 4 and 5. In the illustration given, three clamps 21 in spaced-apart relation are provided for clamping the hog side portion 12 against the anvil 19. Each clamp is mounted upon a lever 22 pivotally mounted upon shaft 16, and a double-acting hydraulic cylinder 23 is provided with a piston arm 24 pivotally connected to an extension of the lever 22. As shown best in FIG. 4, pressure fluid is supplied through the conduits 25 communicating with opposite ends of the cylinder 23 and leading from a manifold 26 communicating with the hollow interior of shaft 16. The hydraulic fluid is supplied to the shaft 16 from reservoir 27 communicating with a power-driven pump (not shown). As above stated, each of the clamp levers 22 is operated by a separate hydraulic cylinder 23 supplied with pressure fluid from manifolds 26 communicating with the hollow interior of shaft 16. As indicated in FIG. 5, the lever 22 may be moved to open position, shown in dotted lines, permitting the leading edge of the hog side to be introduced into the recess, and the clamp may be then moved to closed or clamping position, as shown in solid lines in FIG. 4.

Mounted upon the frame 14 are the supporting ears 28 apertured to receive a shaft 29. On the shaft 29 is mounted a rocking support frame 30 notched to receive the trunnions or rollers 31, as shown best in FIG. 1. Upon the rear end of the support 30 is a knife 32 having its edge lying adjacent the outer periphery of drum 15. As shown best in FIG. 6, a strap 33 pivotally receives the pin 29 of the support 30, and means are provided for raising and lowering the shaft 29 to tilt the support 30 and knife 32.

In the illustration given in FIG. 6, the means employed for operating strap 33 comprises a hydraulic cylinder 34 having its piston shaft 35 pivotally connected to the lower end of strap 33. The cylinder is a single-acting cylinder having a spring normally urging the lower end of strap 33 outwardly but having a hydraulic connection through which pressure fluid may force the piston of the cylinder inwardly to draw the strap 33 inwardly and thus tilt the knife 32 upwardly to provide a substantial clearance between it and the drum 15. If desired, means for setting or adjusting the position of the knife may be provided. In the illustration given, I provide a block 36 fixed to the frame and interiorly threaded to receive a threaded shaft 37 pivotally connected to the cylinder 34 so as to adjust the position of the cylinder 34. It will be understood that any suitable means for adjusting the position of the cylinder 34 may be employed so as to maintain the desired clearance between the knife 32 and the cylinder or drum 15 during the initial skinning operation.

In order to exert pressure upon the hog side 10 after it is clamped within the recess of drum 15, I provide a roller frame or assembly 38 provided with a casing member 39 in which are mounted a number of spring-urged plungers 40, a pair of plungers being secured to a bracket 41 in which is mounted a roller 42, as illustrated best in FIGS. 2 and 3.

In the practice of my invention, I provide means for moving the pressure roller frame or assembly 38 in a longitudinal direction to vary the clearance between the rollers and the drum 15. In the specific illustration given, the means for moving the pressure roller assembly 38 is accomplished by supporting the assembly frame upon strap extensions 43, with the lower portion of the straps 43 pivotally secured to the frame. As shown best in FIGS. 1 and 2, the straps 43 are provided with pivot pins 44 received within a pivot opening 45 in the frame bracket 46. For the purpose of adjustment, the frame bracket 46 may be provided with additional spaced adjustment openings 47. By providing the extensions 43 and forming the pivots at the lower portion of the machine, it is possible to shift the pressure roller assembly 38 laterally so as to move the pressure rollers 42 rearwardly, as indicated in solid and dotted lines in FIG. 7. By way of example, the roller 42 shown in solid lines may be spaced from the drum 15 at the beginning of the operation at a distance of about ⅝ inch, and when moved rearwardly approximately 4 inches, the spacing is about one inch. Thus, for the pressure operation in which the thinner portion of the hog side is being skinned, the roller 42 shown in dotted lines is effective, while when the thicker portion 13 of the hog side 10 is being skinned, the roller 42 shown in dotted lines is effective for exerting the proper pressure and without bringing about and undue elongation of the valuable bacon portion 13.

I prefer to connect the assembly frame member 38 and the straps 43 with spaced pivot pins 38a, as shown best in FIG. 1. The pins 38a on one side may be withdrawn, and the frame 38 tilted on the remaining pins 38a on one side so as to tilt the frame 38 upon the straps 43, thus providing ready access to the knife therebelow when access to the knife and associated parts is desired for the purpose of repair, adjustment, etc.

Any suitable means for moving the pivotally-mounted pressure roller assembly 38 may be employed. In the specific illustration given, I provide a pair of double-acting power cylinders 48, as shown best in FIG. 1, with one end of each cylinder secured to a post 49 fixed to the frame 14, and with the piston stem 50 pivotally secured to a pin 51 fixed to the assembly 38. Pressure fluid is conveyed to the cylinders 48 through the conduits 52.

Any suitable means for providing automatic operation of the various power cylinders may be provided. In the specific illustration given and as shown best in FIG. 6, there is mounted upon the shaft 16 a cam drum 53 provided with cams adapted to engage the valve-actuating members 54, 55 and 56. The valve-controlled member 54 when actuated by the cam in line therewith controls the flow of pressure fluid to the knife-actuating cylinder 34. The actuating member 55 is controlled by its respective cam on member 53 for causing the flow of pressure fluid to the clamping mechanism to move the clamp to the closed and open positions shown best in FIG. 4. Similarly, the plunger-operated member 56 when actuated by its cam on the drum 53 controls the flow of pressure fluid to the double-acting cylinder 48 controlling the movement of the pressure roller assembly 38. Since the cam-operated control members 54, 55 and 56 are well known devices for controlling the flow of pressure fluid, a further detailed description herein is believed unnecessary.

*Operation*

In the operation of the apparatus, the hog side or rough middle 10 is fed to the machine, as indicated in dotted lines in FIG. 1, with the forward edge 12 inserted over the anvil 19 where it is automatically engaged by the three clamps 21 to anchor the forward edge of the side firmly to the rotating drum 15. As the drum moves forwardly, the knife 32 is automatically raised through the flow of pressure fluid within the single-acting cylinder 34. As the drum 15 draws the hog side forwardly, the cam member 53 releases the pressure fluid within cylinder 34, and the spring within the cylinder moves the strap 33 outwardly to case the knife 32 to move downwardly in a floating position against the skin 11 of the hog side 10. The pressure rollers 42, which are now in a substantially vertical position, provide a narrow clearance, such as, for example, about ⅝ inch, which is effective in pressing the forward portion of the hog side into the recess and onto the skinning surface of the drum for engagement with the knife 32. As the skinning operation proceeds and as the thicker portion 13 of the hog side approaches the knife, the cam-operated control 56 causes pressure fluid to flow to cylinders 48, and the roller assembly 38 moves rearwardly to the position shown in dotted lines in FIG. 7, so that a greater clearance is provided between the rollers 42 and the drum 15. In this manner, substantial and effective pressure is exerted against the thicker portion 13 of the hog side 10 but without undue pressure and without elongation of the portion 13.

When the thicker portion 13 has been split from the skin 11, the cam-actuated member 56 reverses the flow of fluid through conduits 52 so as to move the assembly 38 from the forward position shown in FIG. 1 rapidly forward to the upright position shown in solid lines in FIG. 1. Thus, a rapid forward movement of the assembly frame 38 engages the skinned portion of the hog side and ejects it forwardly upon the support 30. At the same time, the cam-operated member 54 causes pressure fluid to flow to the outer end of cylinder 34 to move the piston against the force of the spring and to tilt the strap 33 inwardly and the roller-equipped support 30 downwardly, with the result that the ejected and skinned hog side is discharged from the support 30 upon a conveyor (not shown). Prior to the completion of the skinning operation, the clamps 21 are released and the skin is discharged just prior to the position shown in FIG. 4.

While in the specific illustration given, I have shown a pivotally-mounted pressure roller assembly, together with hydraulic power cylinders for shifting the same, it will be understood that equivalent mechanism may be employed for moving the assembly forwardly and rearwardly to vary the distance between the pressure rollers and the drum 15. Such movement may be accomplished by the use of track supports and power cylinders for moving the same forwardly and rearwardly. I prefer, however, the pivotal arrangement for the advantages which have already been set out herein.

While in the foregoing specification I have described the apparatuse in considerable detail for the purpose of illustrating embodiments of the invention, it will be understood that such detail or details may be varied widely by those skilled in the art without departing from the spirit of my invention.

I claim:

1. In apparatus for skinning hog sides and the like, a frame, a drum rotatably mounted in said frame and having a longitudinal recess therein for receiving an end portion of said side to be skinned, means for clamping said side end portion within said recess, power means for rotating said drum, a knife supported on said frame for splitting the skin from said side, a pressure roller frame pivotally mounted on said first-mentioned frame and equipped with spring-urged rollers adapted to press said side toward said recesses, and power means for moving said roller frame rearwardly to widen the spacing between the rollers and the drum and for moving the roller frame forwardly to eject the skinned side.

2. The structure of claim 1 in which said knife is carried by a pivotally-mounted support and in which said support is tilted forwardly as said roller frame is moved forwardly.

3. The structure of claim 1 in which means are provided for tilting the support for said knife.

References Cited by the Examiner
UNITED STATES PATENTS

| | | | |
|---|---|---|---|
| 1,291,173 | 1/1919 | Salmon | 146—130 |
| 2,155,730 | 4/1939 | Miller | 146—130 |
| 2,292,319 | 8/1942 | Dziedzic et al. | 146—130 |
| 2,681,675 | 6/1954 | Burch | 146—130 |
| 2,989,105 | 6/1961 | Burch | 146—130 |

WILLIAM W. DYER, JR., *Primary Examiner.*

W. GRAYDON ABERCROMBIE, *Examiner.*